(12) United States Patent
Asai

(10) Patent No.: US 9,797,354 B2
(45) Date of Patent: Oct. 24, 2017

(54) FUEL LINE JOINT

(71) Applicant: Sumitomo Riko Company Limited, Komaki-shi, Aichi-ken (JP)

(72) Inventor: Takahiro Asai, Ichinomiya (JP)

(73) Assignee: TOKAI RUBBER INDUSTRIES, LTD., Komaki-shi (JP)

(*) Notice: Subject to any disclaimer, the term of this patent is extended or adjusted under 35 U.S.C. 154(b) by 195 days.

(21) Appl. No.: 14/329,440

(22) Filed: Jul. 11, 2014

(65) Prior Publication Data

US 2015/0021907 A1    Jan. 22, 2015

(30) Foreign Application Priority Data

Jul. 22, 2013    (JP) ................... 2013-151748

(51) Int. Cl.
*B60K 15/035* (2006.01)
*B60K 15/03* (2006.01)
*F02M 37/00* (2006.01)

(52) U.S. Cl.
CPC ... *F02M 37/0017* (2013.01); *B60K 15/03519* (2013.01); *B60K 2015/03394* (2013.01); *B60K 2015/03509* (2013.01); *B60K 2015/03538* (2013.01); *B60K 2015/03552* (2013.01); *Y10T 137/3084* (2015.04); *Y10T 137/86324* (2015.04); *Y10T 137/86332* (2015.04)

(58) Field of Classification Search
CPC .... B60K 15/03519; B60K 2015/03509; B60K 2015/03538; B60K 2015/03019; B60K 2015/03394; B60K 2015/03552; B60K 2015/03576; Y10T 137/86332; Y10T 137/86324; Y10T 137/3084; F02M 37/0017; F02M 55/004; F02M 55/007

USPC .... 137/588, 587, 197, 173, 656.01; 123/576
See application file for complete search history.

(56) References Cited

U.S. PATENT DOCUMENTS 3,800,978 A * 4/1974 Sigwald ............... B60K 15/035
                                                                                 137/587
4,702,268 A   10/1987 Ambruster et al.
(Continued)

FOREIGN PATENT DOCUMENTS

| JP | A-2001-80372 | 3/2001 |
| JP | A-2005-163836 | 6/2005 |
| JP | A-2009-539679 | 11/2009 |

OTHER PUBLICATIONS

Jan. 19, 2017 Office Action issued in Japanese Application No. 2013-151748.

*Primary Examiner* — Kevin Murphy
*Assistant Examiner* — Kelsey Rohman
(74) *Attorney, Agent, or Firm* — Oliff PLC

(57) ABSTRACT

To provide a fuel line joint capable of improving resistance to an external force in a joint configured to store a liquid fuel. A fuel line joint is equipped with an integrally formed main body portion that has a storage region configured to store a liquid fuel in a lower part thereof and has an opening portion above the storage region of the liquid fuel; a lid that is formed separately from the main body portion, is attached to the main body portion so as to close the opening portion of the main body portion, and is not connected to members other than the main body portion; and a plurality of mounting portions that is formed integrally with the main body portion and mounted to each of a plurality of pipes forming a fuel line.

4 Claims, 6 Drawing Sheets

(56) References Cited

U.S. PATENT DOCUMENTS

| | | | |
|---|---|---|---|
| 5,584,278 A * | 12/1996 | Satoh | ............... B60K 15/03519 123/516 |
| 6,557,581 B2 | 5/2003 | Ehrman et al. | |
| 7,896,022 B2 | 3/2011 | Benjey | |
| 2002/0121300 A1 * | 9/2002 | Ehrman | ........... B60K 15/03519 137/202 |
| 2004/0086331 A1 * | 5/2004 | Iwamoto | ................ B60K 15/03 403/327 |
| 2005/0115615 A1 | 6/2005 | Takayanagi et al. | |
| 2010/0071785 A1 * | 3/2010 | Miura | ................... F16K 24/044 137/429 |
| 2011/0126916 A1 | 6/2011 | Benjey | |
| 2013/0160877 A1 * | 6/2013 | Walter | ............. B60K 15/03504 137/565.22 |

* cited by examiner

FUEL LINE JOINT

INCORPORATION BY REFERENCE

This application is based upon and claims the benefit of priority of the Japanese Patent Application No. 2013-151748, filed on Jul. 22, 2013, the entire contents of which are incorporated herein by reference.

BACKGROUND OF THE INVENTION

1. Field of the Invention

The present invention relates to a fuel line joint.

2. Description of the Related Art

A fuel line joint described in JP-A-2005-163836 is formed by attaching a first main body portion integrally formed with mounting portions for mounting a pipe and a second main body portion integrally formed with a separate mounting portion for mounting a separate pipe by welding. Furthermore, a fuel line joint described in JP-A-2009-539679 is formed by individually molding mounting portions for mounting each of the pipes and combining these mounting portions.

U.S. Pat. No. 4,702,268 discloses a vent valve of a gas and discloses a technique of closing the vent valve by cover members to house a member therein. JP-A-2001-80372 discloses a technique of returning a fuel staying in a lower curved portion of a breather pipe of a fuel tank to a tank main body by sucking the fuel using a pump via a suction pipe.

SUMMARY OF THE INVENTION

However, in the joint described in JP-A-2005-163836, when an external force is applied to mounting targets of each of the pipes, a force that separates a coupling site of the joint is generated. For that reason, the coupling site becomes the weakest site, and it is not easy to improve resistance of the joint.

Meanwhile, in JP-A-2001-80372, when the coupling site between the breather pipe and the suction pipe is coupled by the joint, the liquid fuel is stored in the joint. There was a need for a joint that does not allow the liquid fuel to simply pass but is able to store the liquid fuel. In addition, the joints described in JP-A-2009-539679 and U.S. Pat. No. 4,702,268 are not intended to store the liquid fuel.

The invention was made in view of such circumstances, and an object thereof is to provide a fuel line joint that is able to improve resistance to an external force in the joint configured to store the liquid fuel.

(First Means)

A fuel line joint according to the present means has an integrally formed main body portion that has a storage region configured to store a liquid fuel in a lower part thereof and has an opening portion above the storage region of the liquid fuel; a lid that is formed separately from the main body portion, is attached to the main body portion so as to close the opening portion of the main body portion, and is not connected to members other than the main body portion; and a plurality of mounting portions that is formed integrally with the main body portion and mounted to each of a plurality of pipes forming a fuel line.

The plurality of mounting portions mounted to each of the plurality of pipes are formed integrally with the main body portion. When the external force is applied to the pipe, the external force is applied to the mounting portion and the main body portion. That is, the main body portion and the mounting portion formed integrally have sufficiently high resistance to the external force.

Here, the lid is attached to the opening portion of the main body portion. Moreover, the lid is not connected to the members other than the main body portion. That is, the lid is dependent only on the main body portion and is independent from the members other than the main body portion. For that reason, when the external force is applied to the pipe, a force that tries to be separated from the main unit is not applied to the lid. Thus, even if the external force is generated in the pipe, the joint is not separated. In this way, the resistance of the joint is improved.

Furthermore, in a normally used state, the storage region of the liquid fuel is formed in a lower part of the main body portion, and the opening portion is formed in an upper part thereof. That is, the liquid fuel is not normally present on a joining surface between the main body portion and the lid. For that reason, since the joining surface is not exposed to the liquid fuel at all times, the durability of the joining surface is high. Moreover, as described above, since the external force is not applied to the joining surface, the durability of the joining surface is also high even from this point.

(Second Means)

A fuel line joint according to this means is applied to a breather line that connects a fuel tank and a filler pipe, wherein the fuel line joint includes an integrally molded main body portion having an opening portion; a lid that is formed separately from the main body portion, is attached to the main body portion so as to close the opening portion of the main body portion, is not connected to members other than the main body portion, and forms a storage region configured to store the liquid fuel inside the main body portion in a state of closing the opening portion of the main body portion; a first mounting portion which is formed integrally with the main body portion and mounted to one end portion of a first breather pipe; a second mounting portion which is formed integrally with the main body portion and mounted to one end portion of a second breather pipe; and a third mounting portion which is formed integrally with the main body portion and mounted to one end portion of a suction pipe.

The first breather pipe is a pipe that has an upper space of the fuel tank communicating with the other end side thereof to discharge air in the fuel tank to the outside of the fuel tank, the second breather pipe is a pipe that has the filler pipe communicating with the other end side thereof to discharge air that passes through the first breather pipe from the fuel tank to the filler pipe side, and the suction pipe is a pipe that has the fuel tank side communicating with the other end side thereof to supply the liquid fuel stored in the main body portion to the fuel tank side.

First and second breather pipes, and first, second, and third mounting portions each mounted to the suction pipe are molded integrally with the main body portion. When the external force is applied to one of the pipes, the external force is applied to the respective mounting portions and the main body portion. That is, the main body portion and the respective mounting portions formed integrally have sufficiently high resistance to the external force.

Here, the lid is attached to the opening portion of the main body portion. Moreover, the lid is not connected to the members other than the main body portion. For that reason, when the external force is applied to one of the pipes, a force that tries to be separated from the main body portion is not applied to the lid. Thus, even if the external force is generated in one of the pipes, the joint is not separated. In this way, the resistance of the joint is improved.

Hereinafter, a preferred embodiment of the fuel line joint according to the first means will be described below. In addition, this is appropriately applicable to a fuel line joint according to the second means.

Preferably, the fuel line joint is applied to a breather line that connects the fuel tank and the filler pipe, and the plurality of mounting portions include a first mounting portion mounted to one end portion of the first breather pipe, a second mounting portion mounted to one end portion of a second breather pipe, and a third mounting portion mounted to one end portion of a suction pipe. The first breather pipe is a pipe that has an upper space in the fuel tank communicating with the other side thereof to discharge air in the fuel tank to the outside of the fuel tank, the second breather pipe is a pipe that has the filler pipe communicating with the other end side thereof to discharge air that passes through the first breather pipe from the fuel tank to the filler pipe side, and the suction pipe is a pipe that has the fuel tank side communicating with the other end side thereof, sucks the liquid fuel stored in the main body portion, and returns the liquid fuel to the fuel tank side.

In this way, the main body portion is connected to the fuel tank via the first breather pipe and the suction pipe, and is connected to the filler pipe via the second breather pipe. For example, in the case in which a vehicle collides or the like, a force that relatively moves the connection part of the filler pipe and the fuel tank is generated. In such a case, the joint is not separated.

Preferably, the first mounting portion is mounted to one end portion located at the lowermost end of the first breather pipe, and the second mounting portion is mounted to one end portion located at the lowermost end of the second breather pipe.

By connecting the first mounting portion and the second mounting portion as described above, in the line of the first breather pipe and the second breather pipe, vaporized fuel discharged from the fuel tank via the first breather pipe is liquefied and stored in the main body portion. In this case, the liquid fuel stored in the main body portion is reliably returned to the fuel tank via the suction pipe.

Preferably, an opening portion of the third mounting portion which is in the main body portion side is formed below opening portions of the first mounting portion and the second mounting portion which are in the main body portion side, and is opened to the storage region of the main body portion. Thus, the liquid fuel stored in the storage region is reliably returned to the fuel tank from the opening portion of the third mounting portion via the suction pipe.

Preferably, the opening portions of the first mounting portion and the second mounting portion which are in the main body portion side are opened above a liquid surface of liquid fuel in the storage region of the main body portion. Thus, it is possible to reliably discharge air in the fuel tank to the outside of the fuel tank via the first and second breather pipes. That is, the first and second breather pipes reliably function as breather lines.

Preferably, the lid is attached to the main body portion by welding. Since the external force is not generated in a joining surface due to welding between the lid and the main body portion, the durability of the joining surface due to welding is high.

Preferably, a separate member that relatively moves with respect to the main body portion is not housed in the interior of the main body portion. That is, the joint is intended to store the liquid fuel.

DETAILED DESCRIPTION OF THE PREFERRED EMBODIMENTS

EXAMPLE 1

(Entire Fuel Line)

A fuel line to which a fuel line joint of a first embodiment is applied will be described with reference to FIG. 1. The fuel line in the present embodiment is a line from a supply port of the liquid fuel to an internal combustion engine (not illustrated) in an automobile. However, in this embodiment, an example of a space from the supply port of the liquid fuel to the fuel tank is adopted.

The fuel line is equipped with a fuel tank 10, a filler pipe 20, and a breather line 30. In addition, although not illustrated, there is a fuel supply line configured to supply the liquid fuel to the internal combustion engine side from the fuel tank 10. The fuel tank 10 stores the liquid fuel such as gasoline. Moreover, the liquid fuel stored in the fuel tank 10 is supplied to the internal combustion engine (not illustrated) and is used to drive the internal combustion engine. The fuel tank 10 is disposed at a bottom of the vehicle and is provided in a relatively movable manner with respect to a vehicle frame (not illustrated). For example, when a vehicle collides, the fuel tank 10 moves with respect to the vehicle frame.

The filler pipe 20 is a pipe that connects the parts from the refueling port 21 to the fuel tank 10. A refueling cap 22 is attached to the refueling port 21. A refueling nozzle (not illustrated) is inserted into the refueling port 21 and the liquid fuel is supplied from the refueling nozzle, thereby storing the liquid fuel in the fuel tank 10 through the filler pipe 20. Here, when the fuel tank 10 is filled with the liquid fuel, the liquid fuel is stored in the filler pipe 20, the liquid fuel touches a front end of the refueling nozzle, and thus, the supply of the liquid fuel using the refueling nozzle is automatically stopped.

A breather line 30 is connected to a site near the refueling port 21 between the fuel tank 10 and the filler pipe 20. The breather line 30 is a pipe that discharges air in the fuel tank 10 to the outside of the fuel tank 10, when supplying the liquid fuel to the fuel tank 10 via the filler pipe 20.

Figure 1:
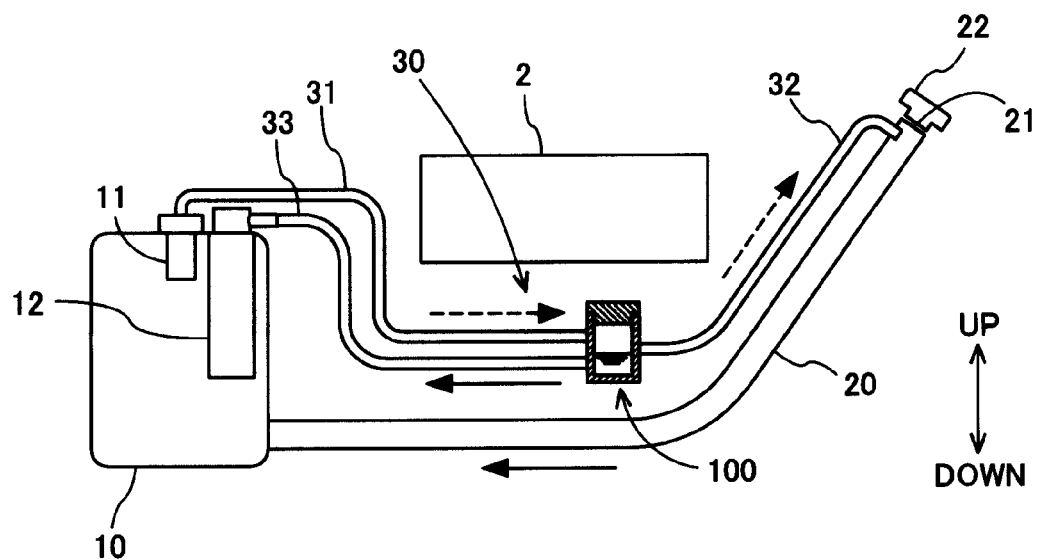
FIG. 1 is an overall view of a fuel line of a first embodiment.
Figure 2:
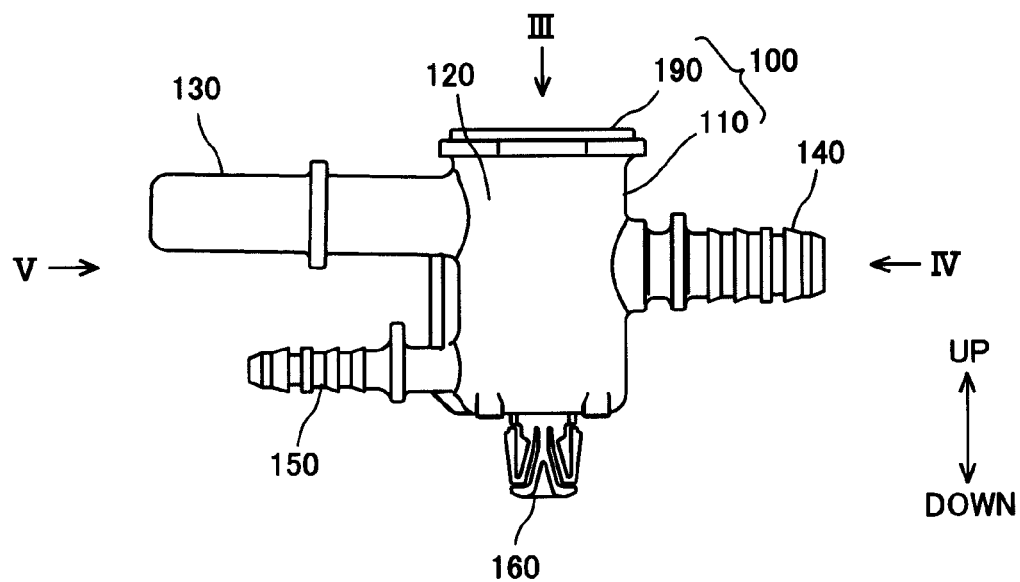
FIG. 2 is a front view of the joint of FIG. 1.
Figure 3:
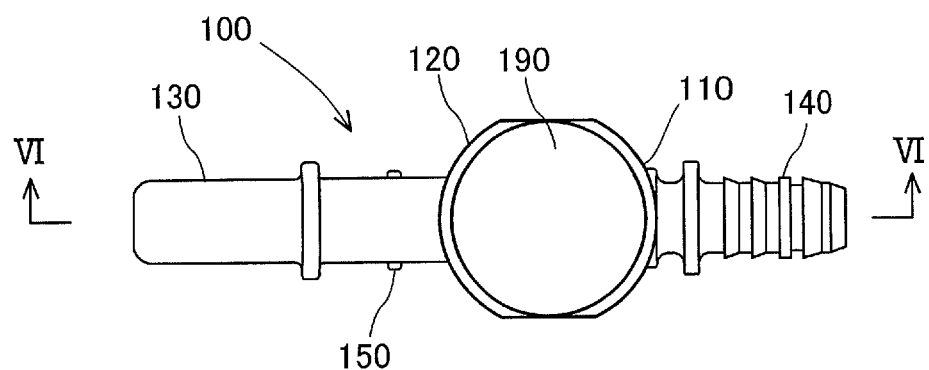
FIG. 3 is a view as seen from a direction III of FIG. 2.
Figure 4:
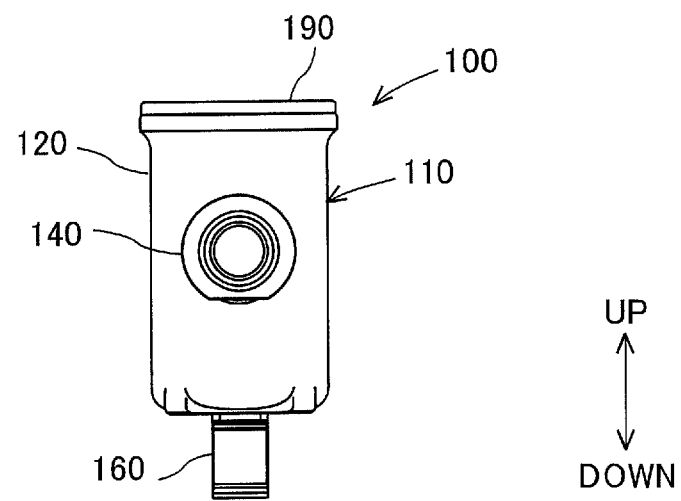
FIG. 4 is a view as seen from a direction IV of FIG. 2.
Figure 5:
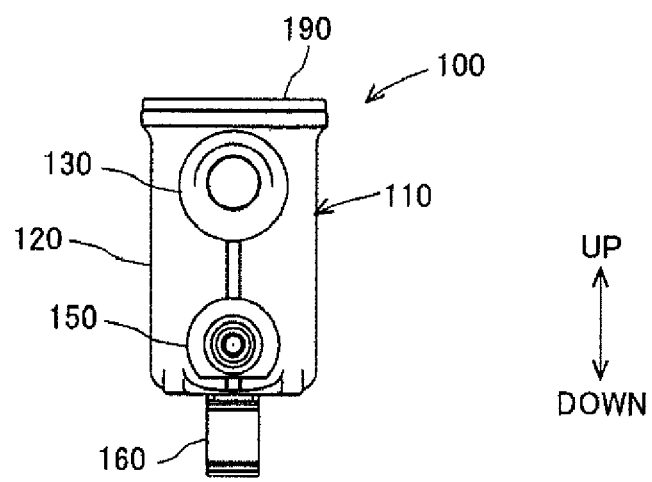
FIG. 5 is a view as seen from a direction V of FIG. 2.

As illustrated in FIG. 1, since the frame 2 of the vehicle is present, an intermediate portion of the breather line 30 hangs downward. That is, one end of the breather line 30 is connected to an upper portion of the fuel tank 10, the other end thereof is connected to the vicinity of the refueling port 21 of the filler pipe 20, and the intermediate portion is located below the upper portion of the fuel tank 10 and is located below the vicinity of the refueling port 21.

Here, when air is discharged from the fuel tank 10 in the breather line 30, the vaporized fuel is discharged at the same time. Moreover, since the intermediate portion of the breather line 30 hangs downward, the vaporized fuel discharged from the fuel tank 10 is liquefied and stored.

Therefore, in the present embodiment, in order to return the liquid fuel stored in the intermediate portion of the breather line 30 to the fuel tank 10, the breather line 30 is constituted by a first breather pipe 31, a second breather pipe 32, a suction pipe 33, and a joint 100 that connects these pipes 31 to 33.

The joint 100 is disposed at a hanging-down position of the breather line 30 so that the liquid fuel present in the breather line 30 is stored. The first breather pipe 31 is a pipe that is mounted to the joint 100 at one end portion thereof and communicates the other end side thereof with the upper space of the fuel tank 10 to discharge air in the fuel tank 10 to the outside of the fuel tank. The other end portion of the first breather pipe 31 is connected to a cut valve 11 disposed on the upper portion of the fuel tank 10. That is, when the cut valve 11 is in a released state, air in the fuel tank 10 is discharged to the first breather pipe 31.

The second breather pipe 32 is a pipe that is mounted to the joint 100 at one end portion and is in communication with the vicinity of the refueling port 21 of the filler pipe 20 at the other end side to discharge air which passes through the first breather pipe from the fuel tank 10 to the filler pipe 20 side. That is, air in the fuel tank 10 sequentially passes through the cut valve 11, the first breather pipe 31, the joint 100, and the second breather pipe 32 and is discharged to the vicinity of the refueling port 21 of the filler pipe 20.

The suction pipe 33 is a pipe that is mounted to the joint 100 at one end portion and has the fuel tank 10 side communicating with the other end side thereof to suck the liquid fuel stored in the joint 100 and return the liquid fuel to the fuel tank 10 side. The other end portion of the suction pipe 33 is connected to the pump 12 disposed in the interior of the fuel tank 10. That is, by the suction force of the pump 12, the liquid fuel stored in the joint 100 is returned to the fuel tank 10 via the suction pipe 33.

In this way, even in the state in which the liquid fuel is stored in the intermediate portion of the breather line 30, the liquid fuel can be returned to the fuel tank 10 via the suction pipe 33. Therefore, the first breather pipe 31 and the second breather pipe 32 reliably function as a route through which air in the fuel tank 10 is discharged.

(Detailed Configuration of Joint)

Next, a detailed configuration of the joint 100 will be described with reference to FIGS. 2 to 6. Here, FIGS. 2 and 4 to 6 illustrate the upper side of the joint 100 in the state in which the upper side in the drawings is mounted to the vehicle, and illustrate the lower side of the joint 100 in the state in which the lower side in the drawings is mounted.

As illustrated in each drawing, the joint 100 is equipped with a joint main body 110 made of a resin, and a lid 190 made of a resin. The entire joint main body 110 is integrally formed. Furthermore, the lid 190 is formed separately from the joint main body 110, and is formed integrally as a whole. Moreover, the joint 100 does not have separate members other than the joint main body 110 and the lid 190.

The joint main body 110 is equipped with a main body portion 120, a first mounting portion 130, a second mounting portion 140, a third mounting portion 150, and a locking portion 160. That is, the respective portions 120, 130, 140, 150, and 160 are integrally formed. The main body portion 120 is formed into a bottomed cylindrical shape having an opening portion 121. That is, a storage region 125 configured to store the liquid fuel is formed inside the main body portion 120. Here, in the present embodiment, the joint main body 110 is disposed so that the bottom portion is located on the lower side and the opening portion 121 is located on the upper side. Therefore, the storage region 125 is formed on the lower side of the interior of the main body portion 120, and the opening portion 121 is formed above the storage region 125. Furthermore, relatively movable other members are not housed inside the main body portion 120. That is, the interior of the main body portion 120 is a simple space.

The first mounting portion 130 is formed in a cylindrical shape, is provided so as to project radially from an outer peripheral surface of the main body portion 120, and is integrally formed with the main body portion 120. The first mounting portion 130 is provided at a position on the outer peripheral surface of the main body portion 120 which is in the opening portion 121 side. That is, the inner opening portion of the first mounting portion 130 is opened at a position that is close to the opening portion 121 of the inner peripheral surface of the main body portion 120.

Figure 6:
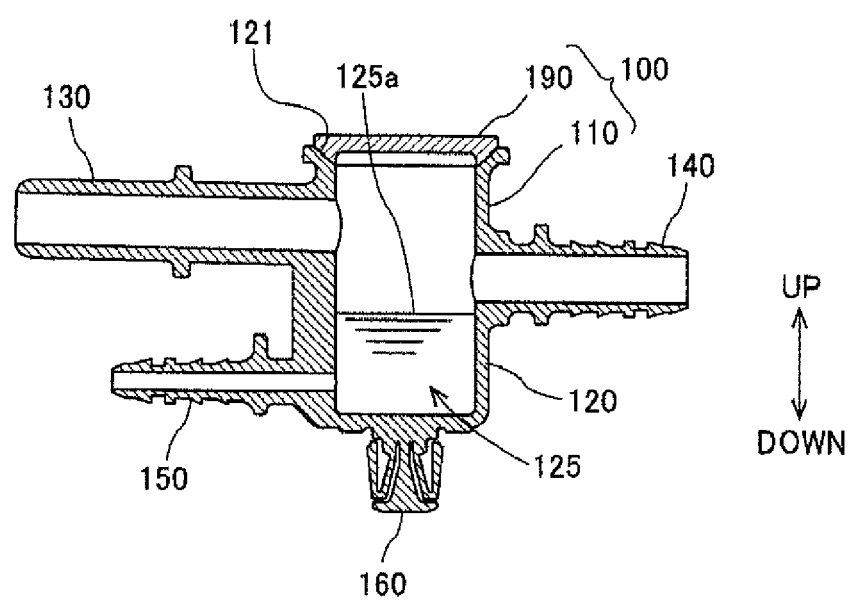
FIG. 6 is a cross-sectional view taken along a line VI-VI of FIG. 3.

As illustrated in FIG. 6, an inner opening portion (an opening portion of the main body portion 120 side) of the first mounting portion 130 is opened above the liquid surface 125a of the liquid fuel in the storage region 125 of the interior of the main body portion 120. One end portion of the first breather pipe 31 is mounted to the outer surface of the first mounting portion 130. In particular, as illustrated in FIG. 1, the first mounting portion 130 is mounted to one end portion located at the lowermost end of the first breather pipe 31.

The second mounting portion 140 is formed in a cylindrical shape, is provided so as to project radially from the outer peripheral surface of the main body portion 120, and is integrally formed with the main body portion 120. The outer peripheral surface of the second mounting portion 140 is formed in a bamboo shoot shape, that is, in an axially uneven shape so as to be easily caught by a mating member. The second mounting portion 140 is provided at a position of the outer peripheral surface of the main body portion 120 which is the opening portion 121 side, and is provided so as to project in a direction opposite to the first mounting portion 130. That is, the inner opening portion of the second mounting portion 140 is opened at a position close to the opening portion 121 of the inner peripheral surface of the main body portion 120.

As illustrated in FIG. 6, the inner opening portion (the opening portion of the main body portion 120 side) of the second mounting portion 140 is opened above the liquid surface 125a of the liquid fuel in the storage region 125 of the interior of the main body portion 120. One end portion of the second breather pipe 32 is mounted to the outer surface of the second mounting portion 140. In particular, as illustrated in FIG. 1, the second mounting portion 140 is mounted to one end portion located at the lowermost end of the second breather pipe 32.

The third mounting portion 150 is formed in a cylindrical shape, is provided so as to project radially from the outer peripheral surface of the main body portion 120, and is integrally formed with the main body portion 120. The third mounting portion 150 projects in the same direction as that of the first mounting portion 130. Like the second mounting portion 140, the outer peripheral surface of the third mounting portion 150 is formed in a bamboo shoot shape, that is, in an axially uneven shape. The third mounting portion 150 is provided at a position on the bottom side of the outer peripheral surface of the main body portion 120. That is, the inner opening portion of the third mounting portion 150 is formed below the inner opening portions of first mounting portion 130 and the second mounting portions 140.

Moreover, as described above, the storage region 125 configured to store the liquid fuel is formed below the interior of the main body portion 120. Accordingly, the inner opening portion of the third mounting portion 150 is opened to the storage region 125 of the interior of the main body portion 120 on the inner peripheral surface of the main body portion 120. One end portion of the suction pipe 33 is mounted to the outer surface of the third mounting portion 150. Thus, the liquid fuel present in the storage region 125 of the main body portion 120 is reliably returned to the fuel tank 10 via the third mounting portion 150 and the suction pipe 33.

The locking portion 160 is provided on the outer surface of the bottom portion of the main body portion 120 and is formed integrally with the main body portion 120. The locking portion 160 is attachable to and detachable from a frame or the like of the vehicle. Therefore, the joint 100 is positioned by mounting the locking portion 160 to the frame.

The lid 190 is formed separately from the joint main body 110 and is attached by welding to the main body portion 120 so as to close the opening portion 121 of the main body portion 120. Furthermore, the lid 190 is not connected to the members other than the main body portion 120. Accordingly, the lid 190 is connected only to the main body portion 120. That is, the lid 190 is dependent only on the main body portion 120 and is independent from the members other than the main body portion 120.

The following effects are achieved from the above. The first, second, and third mounting portions 130, 140, and 150 mounted to each of the first and second breather pipes 31 and 32 and the suction pipe 33 are formed integrally with the main body portion 120. When the external force is applied to one of the pipes 31, 32 and 33, the external force is applied to each of the mounting portions 130, 140, and 150 and the main body portion 120. That is, the main body portion 120 and each of the mounting portions 130, 140, and 150 formed integrally have the sufficiently high resistance to the external force.

Furthermore, the lid 190 is attached to the opening portion 121 of the main body portion 120. Moreover, the lid 190 is not connected to the members other than the main body portion 120. For that reason, when the external force is applied to one of the pipes 31, 32 and 33, a force that tries to be separated from the main body portion 120 is not applied to the lid 190. Thus, even if the external force is generated in one of the pipes 31, 32 and 33, the joint 100 is not separated. In this way, the resistance of the joint 100 is improved.

Furthermore, in the normally used state, in the main body portion 120, the storage region 125 of the liquid fuel is formed in the lower part and the opening portion 121 is formed in the upper part. That is, the liquid fuel is not always present on a welded joining surface between the main body portion 120 and the lid 190. For that reason, since the welded joining surface is not exposed to the liquid fuel at all times, the durability of the welded joining surface is high. Moreover, as described above, since the external force is not applied to the welded joining surface, the durability of the welded joining surface is also high from this point.

Here, as illustrated in FIG. 1, the intermediate portion of the breather line 30 hangs downward by the presence of the frame 2 of the vehicle. At this time, the first mounting portion 130 is mounted to one end portion located at the lowermost end of the first breather pipe 31, and the second mounting portion 140 is mounted to the one end portion located at the lowermost end of the second breather pipe 32. By connecting the first mounting portion 130 and the second mounting portion 140 as described above, in the lines of the first breather pipe 31 and the second breather pipe 32, the vaporized fuel discharged from the fuel tank 10 via the first breather pipe 31 is liquefied and stored in the main body portion 120. In this case, the liquid fuel stored in the main body portion 120 is reliably returned to the fuel tank 10 via the suction pipe 33.

In particular, the inner opening portion of the third mounting portion 150 is formed below the inner opening portions of the first mounting portion 130 and the second mounting portions 140 and opened to the storage region 125 of the main body portion 120. Thus, the liquid fuel stored in the storage region 125 is reliably returned to the fuel tank 10 from the inner opening portion of the third mounting portion 150 via the suction pipe 33.

Moreover, the inner opening portions of the first mounting portion 130 and the second mounting portion 140 are opened above the liquid surface 125a of the liquid fuel in the storage region 125 of the main body portion 120. Accordingly, a distribution route of air in the fuel tank 10 is formed in the order of the first breather pipe 31→ the first mounting portion 130→ the upper space of the main body portion 120→ the second mounting portion 140→ the second breather pipe 32. Moreover, the route does not pass through the storage region 125 in which the liquid fuel is stored in the main body portion 120. Therefore, it is possible to reliably discharge air in the fuel tank 10 to the outside of the fuel tank 10 via the first and second breather pipes 31 and 32. That is, the first and second breather pipes 31 and 32 reliably function as the breather lines.

EXAMPLE 2

Next, a detailed configuration of a joint 200 of a second embodiment will be described with reference to FIGS. 7 to 12. Here, similarly to the above-described joint 100, the joint 200 in this embodiment is applied to the breather line 30 as illustrated in FIG. 1 and is connected to each of one end portions of the first breather pipe 31, the second breather pipe 32, and the suction pipe 33. Furthermore, FIGS. 7 and 11 illustrate the upper side of the joint 100 in the state of mounting the upper side in the drawings to the vehicle, and illustrate the lower side of the joint 200 in the state of mounting the lower side of the drawings.

The joint 200 is equipped with a joint main body 210 and a lid 290. The joint main body 210 is equipped with a main body portion 220, a first mounting portion 230, a second mounting portion 240, a third mounting portion 250, and a locking portion 260. Here, each portion of the joint 200 of the present embodiment is mainly common to each portion of the joint 100. Only the differences will be described below.

Figure 7:
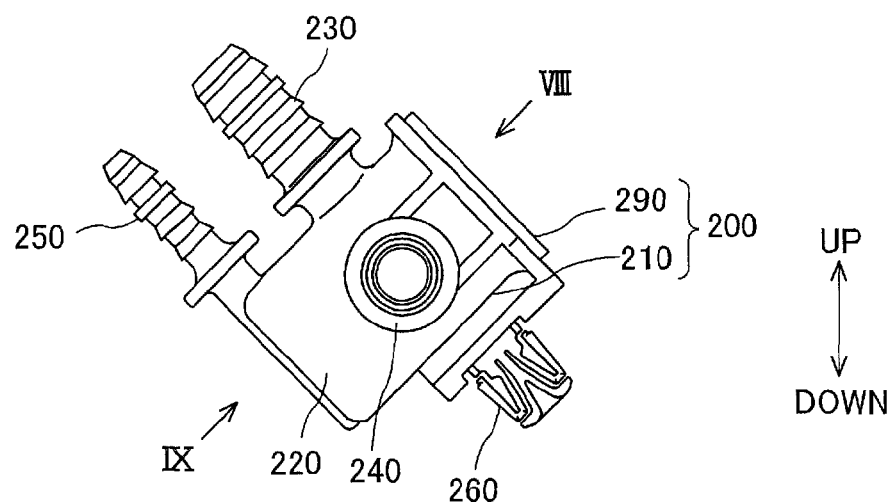
FIG. 7 is a front view of a joint of a second embodiment.
Figure 11:
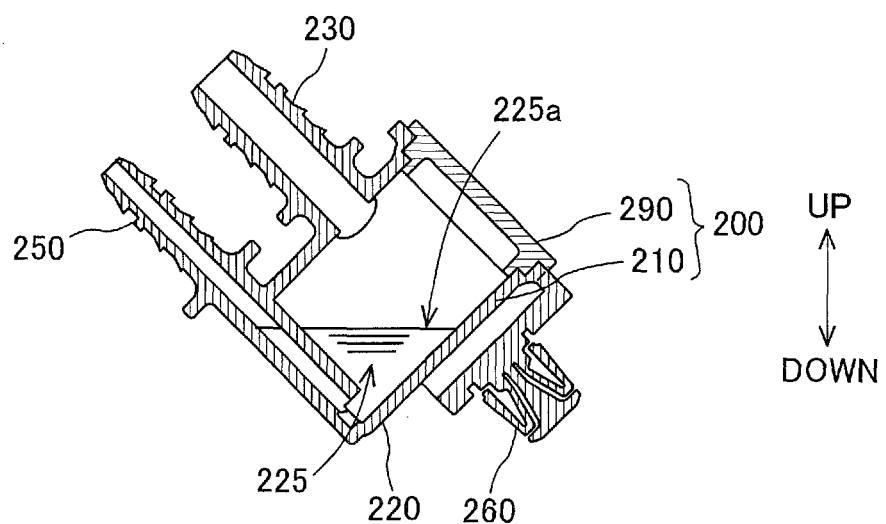
FIG. 11 is a cross-sectional view taken along a line XI-XI of FIG. 8.
Figure 12:
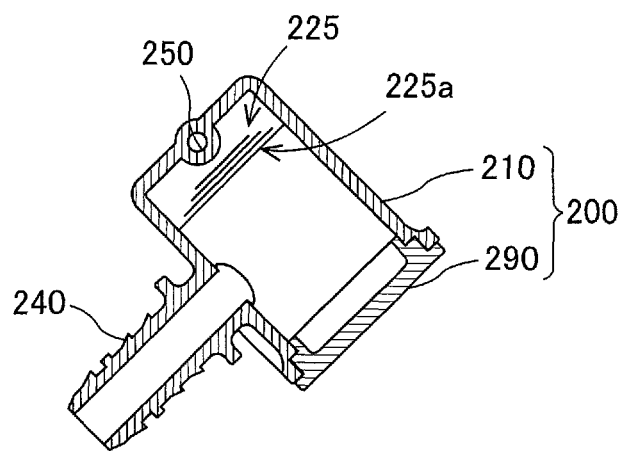
FIG. 12 is a cross-sectional view taken along a line XII-XII of FIG. 8.

As illustrated in FIGS. 7 and 11, the joint 200 is attached to the vehicle so that a cylindrical axis direction of the main body portion 220 is inclined with respect to a vertical direction. At this time, the storage region 225 in which the liquid fuel is stored inside the main body portion 220 is in the state of being biased to a certain edge of the bottom.

Figure 8:
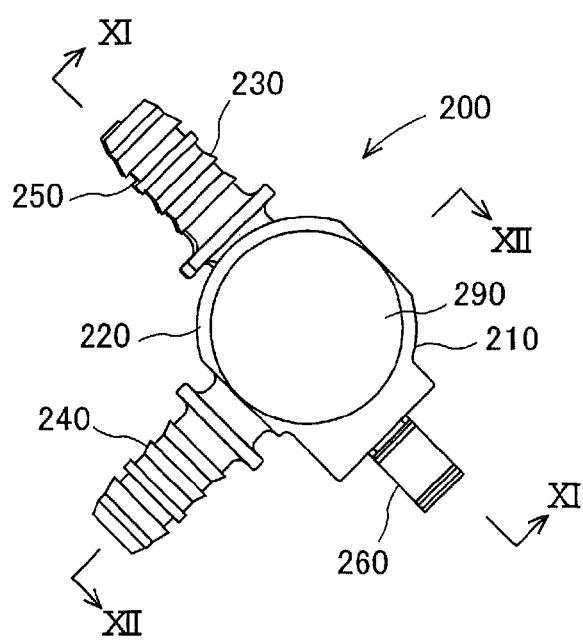
FIG. 8 is a view as seen from a direction VIII of FIG. 7.
Figure 9:
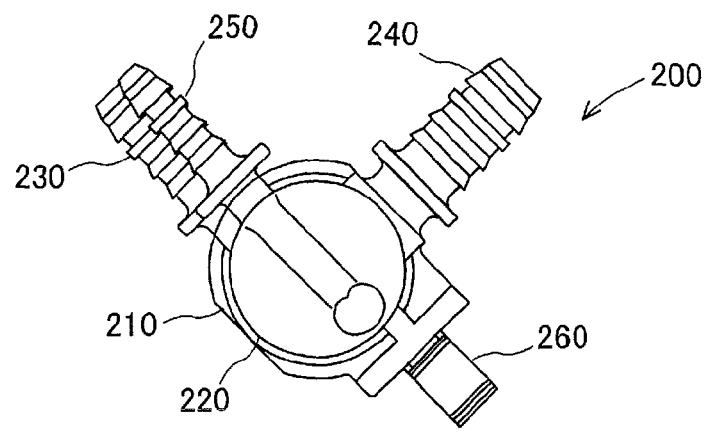
FIG. 9 is a view as seen from a direction IX of FIG. 7.
Figure 10:
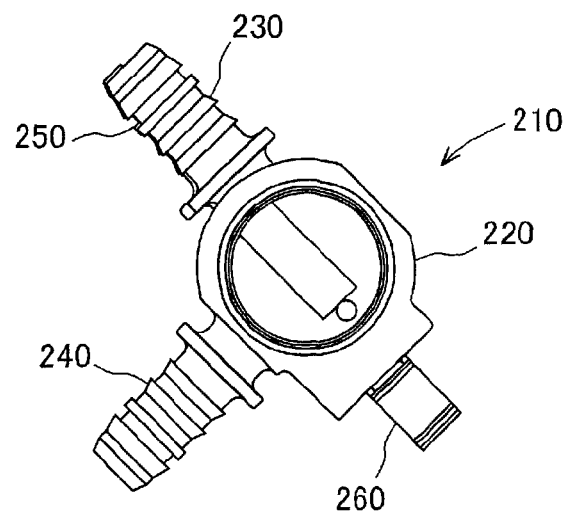
FIG. 10 is a view of a joint main body in the state in which a lid is removed in FIG. 8.

As illustrated in FIG. 7, similarly to the second mounting portion 140, the first mounting portion 230 is formed in a bamboo shoot shape, that is, in an axially uneven shape. As illustrated in FIGS. 8 to 10, the second mounting portion 240 projects from the outer surface of the main body portion 220 so as to have an angle of 90° with respect to a projecting direction of the first mounting portion 230. Moreover, the inner opening portions of the first mounting portion 230 and the second mounting portion 240 are opened above a liquid surface 225a of the liquid fuel in the storage region 225.

The third mounting portion 250 is provided so as to project radially from the outer peripheral surface of the main body portion 220. Furthermore, the third mounting portion 250 is formed so as to project to the interior of the main body portion 220. Moreover, as illustrated in FIG. 11, the inner opening portion of the third mounting portion 250 projecting to the interior is opened to the storage region 225 of the biased state and is opened to the edge of the bottom of the main body portion 220. Similarly to the above-described embodiment, the inner opening portion of the third mounting portion 250 is located below the inner opening portions of the first mounting portion 230 and the second mounting portion 240.

The joint 200 of the present embodiment has the same advantages as those of the joint 100 of the above-described embodiment. It is possible to appropriately select the joint according to the mounting direction of the joints 100 and 200 to the vehicle.

<Others>

In the above-described embodiments, examples of applying the joints 100 and 200 to the breather line have been described. In addition, the joint is similarly applicable to a site in which the liquid fuel is stored in the fuel line.

What is claimed is:

1. A fuel line joint, the fuel line joint applied to a breather line that connects a fuel tank and a filler pipe, an intermediate portion of the breather line hanging downward, the fuel line joint disposed at the intermediate portion, consisting only of:
   a joint main body formed integrally as one piece; and
   a lid formed integrally as one piece,
   wherein:
      the joint main body includes:
         an integrally formed main body portion that has a storage region configured to store a liquid fuel in a lower part thereof and has an opening portion above the storage region of the liquid fuel; and
         a plurality of mounting portions that are formed integrally with the main body portion and are mounted to each of a plurality of pipes forming a fuel line,
   wherein the lid is formed separately from the main body portion, is attached to the main body portion so as to close the opening portion of the main body portion, and is not connected to members other than the main body portion,
   wherein a jointing portion between the opening of the main body portion and the lid is a welding surface,
   wherein the main body portion is formed into a bottomed cylindrical shape having the opening portion, and includes a bottom surface opposing the opening portion and an outer peripheral surface defining the cylindrical shape, the outer peripheral surface being located between the opening portion and the bottom surface, the outer peripheral surface, the opening portion and the bottom surface defining the storage region,
   wherein the plurality of mounting portion includes:
      a first mounting portion, a second mounting portion and a third mounting portion that are located on the outer peripheral surface and project radially from the outer peripheral surface, wherein the first mounting portion is mounted to one end portion of a first breather pipe which is connected to the fuel tank;
      the second mounting portion is mounted to one end portion of a second breather pipe which is connected to the filler pipe; and
      the third mounting portion is mounted to one end portion of a suction pipe which is connected to the fuel tank,
   wherein an opening portion of the third mounting portion, which is in the main body portion side, is formed below, in a height direction in which the bottom surface is positioned at a lower height and the lid is at a higher height, opening portions of the first mounting portion and the second mounting portion which are in the main body portion side, and is opened to the storage region of the main body portion,
   wherein:
   the first breather pipe is a pipe that has an upper space in the height direction in the fuel tank communicating with the other end side thereof to discharge air in the fuel tank to the outside of the fuel tank;
   the second breather pipe is a pipe that has the filler pipe communicating with the other end side thereof to discharge air that passes through the first breather pipe from the fuel tank to the filler pipe side;
   the suction pipe is a pipe that has the fuel tank side communicating with the other end side thereof, sucks the liquid fuel stored in the main body portion, and returns the liquid fuel to the fuel tank side;
   the first mounting portion is mounted to one end portion located at the lowermost end of the first breather pipe in the height direction; and
   the second mounting portion is mounted to one end portion located at the lowermost end of the second breather pipe in the height direction.

2. The fuel line joint according to claim 1, wherein the opening portions of the first mounting portion and the second mounting portion which are in the main body portion side are opened above a liquid surface of liquid fuel in the storage region of the main body portion in the height direction.

3. The fuel line joint according to claim 1, wherein a separate member that relatively moves with respect to the main body portion is not housed in the main body portion.

4. The fuel line joint according to claim 1, wherein the plurality of mounting portions and the main body portion are formed integrally as one piece.

* * * * *